July 12, 1932.  M. SEIFERT  1,867,109
SHUTTER FOR PHOTOGRAPHIC OBJECTIVES
Filed Nov. 27, 1928   2 Sheets-Sheet 1

INVENTOR
MAX SEIFERT
By his ATTORNEYS
Byrnes, Townsend & Brickenstein

July 12, 1932.  M. SEIFERT  1,867,109
SHUTTER FOR PHOTOGRAPHIC OBJECTIVES
Filed Nov. 27, 1928  2 Sheets-Sheet 2
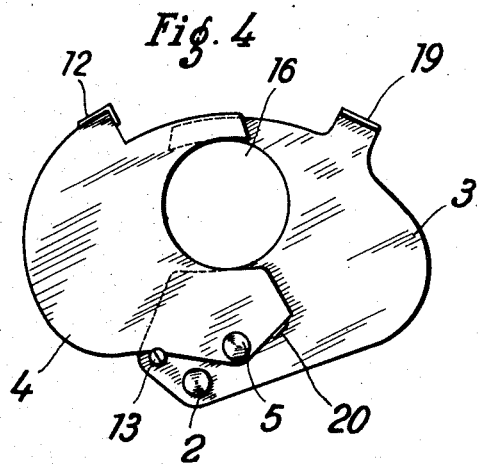
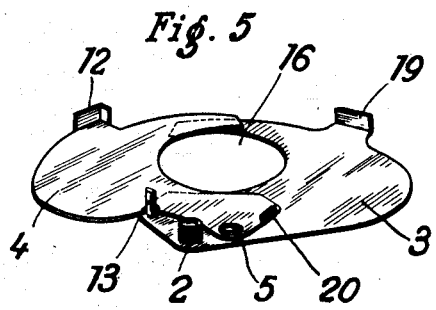
INVENTOR
MAX SEIFERT
By his ATTORNEYS
Byrnes, Townsend & Brickenstein Patented July 12, 1932

1,867,109

UNITED STATES PATENT OFFICE

MAX SEIFERT, OF MUNICH, GERMANY, ASSIGNOR TO AGFA ANSCO CORPORATION, OF BINGHAMTON, NEW YORK, A CORPORATION OF NEW YORK

SHUTTER FOR PHOTOGRAPHIC OBJECTIVES

Application filed November 27, 1928, Serial No. 322,255, and in Germany December 9, 1927.

The present invention relates to a shutter for photographic objectives, more particularly to a shutter in which two blades move in the same direction in succession past the objective. Its object is a shutter in which the time for different speeds is regulated, without the use of inconvenient braking devices by tensioning and releasing the blades in common in the same direction, and having the advantage over other known shutters with two blades following one another that it can be packed in an extremely small space, its external dimensions being similar to those of recent sector shutters (central shutters).

In the shutter according to my invention one blade co-operates with an adjustable locking lever or latch lever and with a second blade, the time of exposure being controlled by the depth of engagement of the locking lever with a corresponding projection of the lagging blade, its release being effected by the eccentric mounting of the second blade on the first. On the return movement of the tensioned blades, the pivot of the lagging blade describes a smaller or greater circular arc according to the eccentricity; the vertical movement of the blade due to this eccentricity is utilized in order to allow it to slide along the adjustable locking lever, the relative rate of motion of the two blades depending on the length of the sliding path traversed. If this path is very short, the blades might follow one another too rapidly, so that at no moment during the passage of the blades would the whole objective opening be free, the slit between the blades would cut off the marginal portions of the objective. For this reason the spring which returns the lagging blade to its original position is weaker than that of the front blade and increases the distance between them. The described construction forms a satisfactory and accurately operating apparatus with small external dimensions.

The accompanying drawings show an example of a shutter according to the invention.

Figure 1:
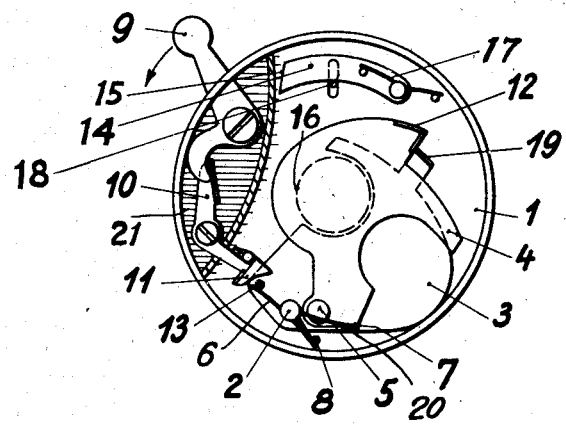
Figure 2:
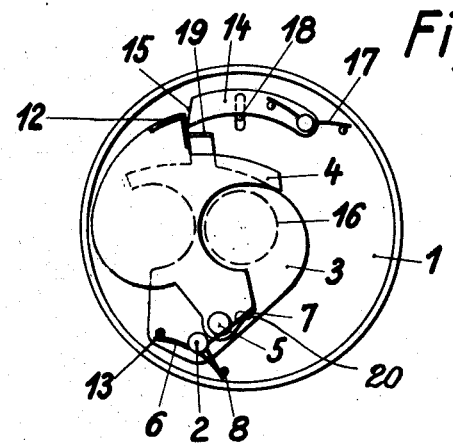
Figure 3:
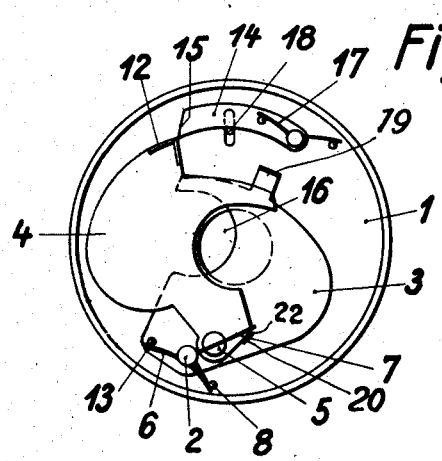

Fig. 1 is an interior view of the shutter showing it in normal position. Fig. 2 is a view similar to Fig. 1 showing the shutter parts in a position they occupy when tensioned ready for exposure with closed blades. Fig. 3 is a view similar to Figs. 1 and 2 illustrating the shutter while effecting instantaneous exposure. Fig. 4 is an enlarged detail view showing the shutter blades in opened position. Fig. 5 is a perspective view of the embodiment shown in Fig. 4.

Referring more particularly to the illustrated embodiment of the invention 1 illustrates an annular plate with a surrounding annular flange forming the shutter casing provided with a central opening 16. 3 and 4 are the shutter blades, the specific form of which is seen in Figs. 4 and 5. The blade 4 is rotatably mounted on the blade 3 with a pin 5, while the blade 3 is pivoted on a pin 2 in the shutter casing 1. Springs 6 and 7 tend always to hold the blades 3 and 4 in the closed position as seen in Fig. 1. The blade 4 is provided with an angular shoulder 12, which strikes against a bent lap 19 of the blade 3 when the shutter is closed.

The springs 6 and 7 may be placed on the pin 2, while the free ends are held by a pin 8 mounted in the casing 1. The other end of the spring 6 acts on a pin 13 on the blade 3 and that of the spring 7 on a shoulder 22 of the blade 4. The operating lever 9 is rotatably mounted in the shutter casing upon a plate 21, a portion of which is shown in Fig. 1. The blades 3 and 4 can slide between said plate 21 and the casing 1. The operating lever 9 acts with one end on the end of a two-armed lever 10 pivoted on the plate 21 and having an operating portion 11 which is positioned in the path of the pin 13 of the blade 3. 14 is a locking lever or latch lever pivoted in the shutter casing 1 and pressed by the spring 17 against the pin 18. The pin 18 is connected with a regulating device outside of the shutter and may be moved to and fro radially in the shutter casing whereby the position of the latch lever 14 is altered.

The shutter operates as follows:

In normal position, all parts of the shutter are situated as seen in Fig. 1. If the operating lever 9 is depressed in the direction indicated in Fig. 1 by an arrow, its movement is transferred to the two-armed lever 10, the free end 11 of which comes in contact with the pin 13 and thus swings the shutter blade 3 about its pivot 2. The shutter blade 4 being pivoted on the blade 3 and striking with its bent lap 19 against the angular shoulder 12 of the blade 3 performs the same swinging movement. Both shutter blades 3 and 4, partly covering each other, pass the objective opening 16 without exposing it. This movement tensions the springs 6 and 7. The edged shoulder 12 of the blade 4 slides along the latch lever 14 and raises it. At the most extreme tension of the shutter, it has passed the latch lever 14, the latter is pressed downwards by the spring 19 and thus the shutter blades are retained in engagement with the front part 15 of the latch lever. This is shown in Fig. 2.

The exposure now is accomplished through a further movement of the operating lever 9 in the same direction, by which the nose 11 of the double-armed lever 10 slides away from the pin 13 and sets it and therewith the shutter blade 3 free. The blade 3 swings back to its initial position by the action of the spring 6, whereat the pivot 5 moves in a circular path on account of its eccentric position regarding the pivot 2. Thereby the blade 4 undergoes a downward movement and the shoulder 12 of the blade 4 slides along the front part 15 of the latch lever 14 until it leaves the action of the latter and snaps back by the action of the spring 7 to its initial position. Fig. 3 shows the shutter while the objective opening is partly opened.

The duration of exposure, obviously, is influenced by the placing of the latch lever 14. If, for instance, by a suitable adjustment of the regulating pin 18 the latch lever is completely engaged with the shoulder 12 of the blade 4, the latter snaps back only if the blade 3 has reached its initial position. If, however, the pin 18 influences the latch lever 14 to strike only partly the shoulder 12, the blade 4 snaps back before blade 3 has completed its return movement. To ensure in this case the complete opening of the objective aperture, the spring 6 of the blade 3 is stronger than the spring 7 of the blade 4 so that the blade 3 runs in advance. If the blades have returned to their original position, the operating lever 9 becomes free and swings back together with the double-armed lever 10 in the position shown in Fig. 1.

I claim:

1. In a shutter for photographic objectives the combination of a casing and blade pivoted upon said casing, a second blade pivoted upon the first blade eccentrically with respect to the pivot of the latter, separate springs to effect the movement of the two blades past the objective, means for moving the two blades against the tension of said springs and into operating position, and means for holding one of said blades in tensioned position until a determinable time after the other blade has been released.

2. A shutter for photographic objectives as defined in claim 1 in which said last named means comprises an adjustable latch lever.

3. A shutter for photographic objectives as defined in claim 1 in which said separate springs are of different strengths.

In testimony whereof, I affix my signature.

MAX SEIFERT.